(No Model.)
E. W. RICE, Jr.
REGULATION OF ELECTRIC MOTORS.
No. 442,668. Patented Dec. 16, 1890.
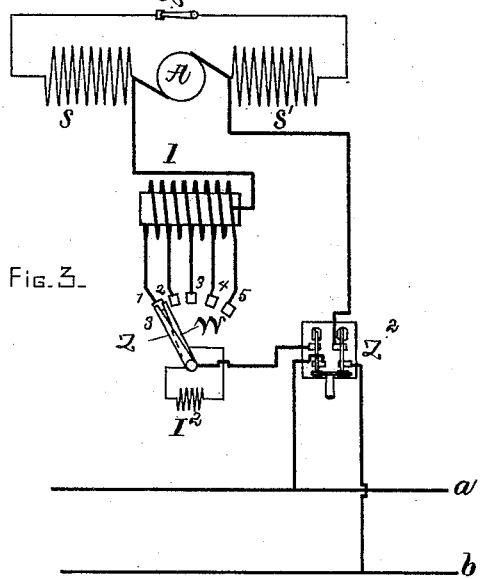
Fig. 3.
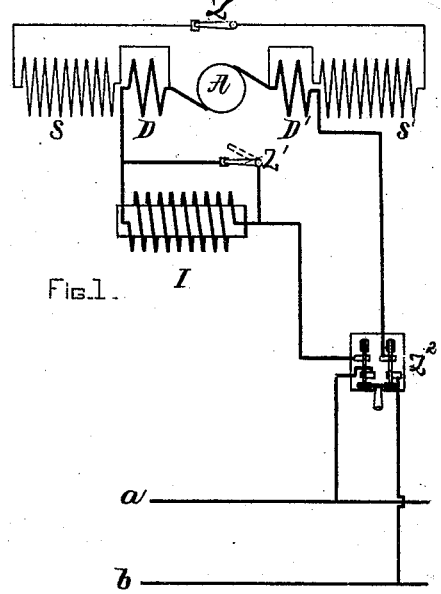
Fig. 1.
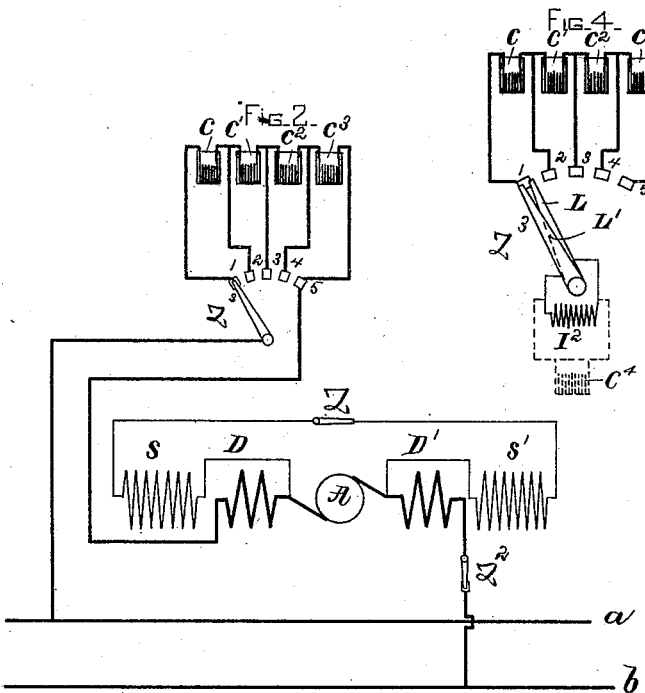
Witnesses—
A. F. Macdonald.
John W. Gibboney
Inventor—
Edwin W. Rice Jr.
Bentley + Knight.
Attys.

UNITED STATES PATENT OFFICE.

EDWIN WILBUR RICE, JR., OF LYNN, MASSACHUSETTS.

REGULATION OF ELECTRIC MOTORS.

SPECIFICATION forming part of Letters Patent No. 442,668, dated December 16, 1890.

Application filed October 20, 1890. Serial No. 368,646. (No model.)

*To all whom it may concern:*

Be it known that I, EDWIN WILBUR RICE, Jr., a citizen of the United States, residing at Lynn, county of Essex, and State of Massachusetts, have invented a certain new and useful Improvement in Regulation of Electric Motors, of which the following is a specification.

My present invention relates to an improved method and apparatus for regulating electric motors, and it will be found of service principally for regulating motors arranged in multiple arc upon a constant-potential circuit.

My object is to guard the motor against injury arising from the passage of excessive current through the armature when starting from a state of rest, and when, as is well known, the resistance offered by the armature is at a minimum by reason of the absence of counter electro-motive force.

It is common to place a resistance in the armature-circuit of an electric motor, which limits the current allowed to flow through the armature upon starting and which is gradually removed from circuit as the armature attains an increased speed and generates of itself a counter electro-motive force, which will reduce the amount of current flowing through its coils. The use of such a resistance, however, is wasteful of energy, and I attain the same desired end without such wasteful expenditure of energy by coupling in series circuit with the armature when starting from a state of rest a counter-potential generator. Then when later the speed of the armature becomes such as to render injury from the passage of excessive current no longer liable the counter-potential generator is shunted or disconnected from circuit entirely by suitable switching devices, which may be actuated manually or automatically by the machine itself.

The accompanying drawings illustrate various forms of the invention, in which—

Figure 1 is a diagrammatic view illustrating the use of a reactive coil as the counter-potential generator. Fig. 2 shows storage-cells employed for the same purpose; and Figs. 3 and 4 show means for regulating the counter-potential generator, whereby its action is rendered uniform and the amount in circuit may be proportioned to the rising counter electro-motive force generated by the motor itself.

In Fig. 1, A represents the armature of an electric motor connected in multiple between the mains $a$ $b$, and the circuit likewise passes through the switch $Z^2$, the direct or coarse wire coils of the field-magnets D D', and the regulator or counter-potential generator I. The ordinary shunt-coils of the field-magnets are seen at S S' connected around the brushes of armature A, and a switch Z is provided for opening and closing the circuit therethrough. At Z' is shown a third switch for controlling a shunt-circuit around the generator I, and this may be replaced at will by an arrangement for disconnecting the generator entirely from circuit—as, for instance, that shown in Fig. 3. If, now, the switch $Z^2$ be thrown to close the motor-circuit when the armature is at rest, an excessive volume of current would tend to flow through the armature-coils, because no resistance thereto would exist except that due to the ordinary or dead resistance of the armature-windings. This is so little there would be danger of burning out the insulation and causing other injury to the motor, such as the burning of the commutator, &c; but if the switch Z' be opened, as in dotted lines, at the time the switch $Z^2$ is closed the current will be compelled to pass through the windings of the inductive-generator I and magnetize the iron core. Before the counter-induction from I, however, ceases to oppose the passage of the current sufficient time will elapse to allow the armature A to attain a rapid speed of revolution. The motor will then generate of itself sufficient counter electro-motive force to act as a resistance to the current, and the external generator I can be short-circuited with safety by closing the switch Z', as in full lines.

In Fig. 2 the counter-potential generator is shown made of a number of storage-cells C C', &c., which are divided into sections connected to contact-terminals 1 2 3, &c., and which are coupled in series with the armature and subsequently removed therefrom in the manner described above. These cells need not necessarily have much capacity, and simple sheets of metal capable of taking but a slight charge will suffice.

To allow the counter electro-motive force due to the external generators (seen in Figs. 1 and 2) to be gradually removed from the armature-circuit in proportion to that generated by the increasing speed of the armature itself, said generators are divided into sections, as illustrated in Figs. 3 and 4, which are switched into and out of circuit serially. Thus in Fig. 3 the windings of the generator I are divided into sections and connected to a series of contact-plates 1 2 3, &c., over which the switch $Z^3$ is adapted to sweep, so as to connect more or less of the coil-sections in circuit. If the end of the switch-arm $Z^3$ were wide enough to bridge two contact-plates, as 1 and 2, it would be seen that when passing from one to the other a section of the winding upon the core would be short-circuited. This short-circuited portion will then usually become the seat of heavy induced currents, thereby impairing the efficiency of the device as a counter-potential generator. On the other hand, if the arm $Z^3$ were made so narrow that it leaves the plate 1 before touching plate 2 the circuit would be entirely interrupted when passing from one to the other. I therefore make the arm $Z^3$ in two parts, which are electrically connected with one another only through a resistance or induction coil, as at $I^2$, which allows the successive cutting out of the section-windings in a smooth and gradual manner, as is described in a patent granted to me April 17, 1888, and numbered 381,420. Fig. 4 shows this same form of switch applied to the counter-induction generator when made of a number of storage-cells, and the action is precisely the same as before. The two parts of the switch-arm $Z^3$ are united through the inductive coil $I^2$, or another storage-cell may be used, as at $C^4$, which will have as many plates as one of the cells of the generator.

What I claim as new, and desire to secure by Letters Patent, is—

1. The herein-described method of regulation for preventing injury to an electric motor upon starting from a state of rest, which consists in maintaining in series circuit with the armature of the motor a counter-potential generator until the speed of the armature becomes such as to generate of itself sufficient counter electro-motive force to render injury from the passage of an excessive current no longer liable and then shunting or disconnecting from circuit the said counter-potential generator, as described.

2. The method of regulation herein described for the protection of electric motors, which consists in coupling a counter-potential generator in series circuit with the armature of the motor when starting from a state of rest and gradually shunting or disconnecting said generator from circuit proportionally to the increase of speed of the armature and consequent counter electro-motive force generated thereby.

3. The combination, with an electric motor fed from a constant-potential circuit, of a counter-potential generator connected in series circuit with the armature of said motor when starting from a state of rest and switching devices for shunting or disconnecting from circuit said counter-potential generator when the speed of the armature has become such as to render it no longer liable to injury from excessive current.

4. The combination, with an electric motor, of a counter-potential generator and switching devices for gradually shunting or cutting said generator into or out of series circuit with the armature of the motor, whereby as the counter electro-motive force of the motor increases in starting from a state of rest the external generator may be correspondingly removed from circuit.

5. The combination, with an electric motor, of a counter-potential generator divided into sections and a switch for cutting more or less of said sections into or out of circuit with the armature of the motor when starting from a state of rest, for the purpose set forth.

6. The combination, with an electric motor fed from a constant-potential circuit, of a counter-potential generator divided into sections and adapted to be cut into series circuit with the armature when starting from a state of rest and a two-part switch for cutting said sections into and out of circuit and having an artificial resistance or reactive coil in circuit between the two parts, as described.

7. The combination, with an electric motor fed from a constant-potential circuit, of an induction counter-potential generator in series circuit with the armature of said motor when starting from a state of rest and switching devices for shunting or disconnecting said generator from circuit when the armature has attained its normal speed of revolution, as described.

In testimony whereof I have hereunto set my hand this 17th day of October, 1890.

EDWIN WILBUR RICE, Jr.

Witnesses:
 JOHN W. GIBBONEY,
 DUGALD McKILLOP.